Aug. 4, 1936.  W. CZARNECKI  2,050,041
RELIEF VALVE
Filed Dec. 24, 1934
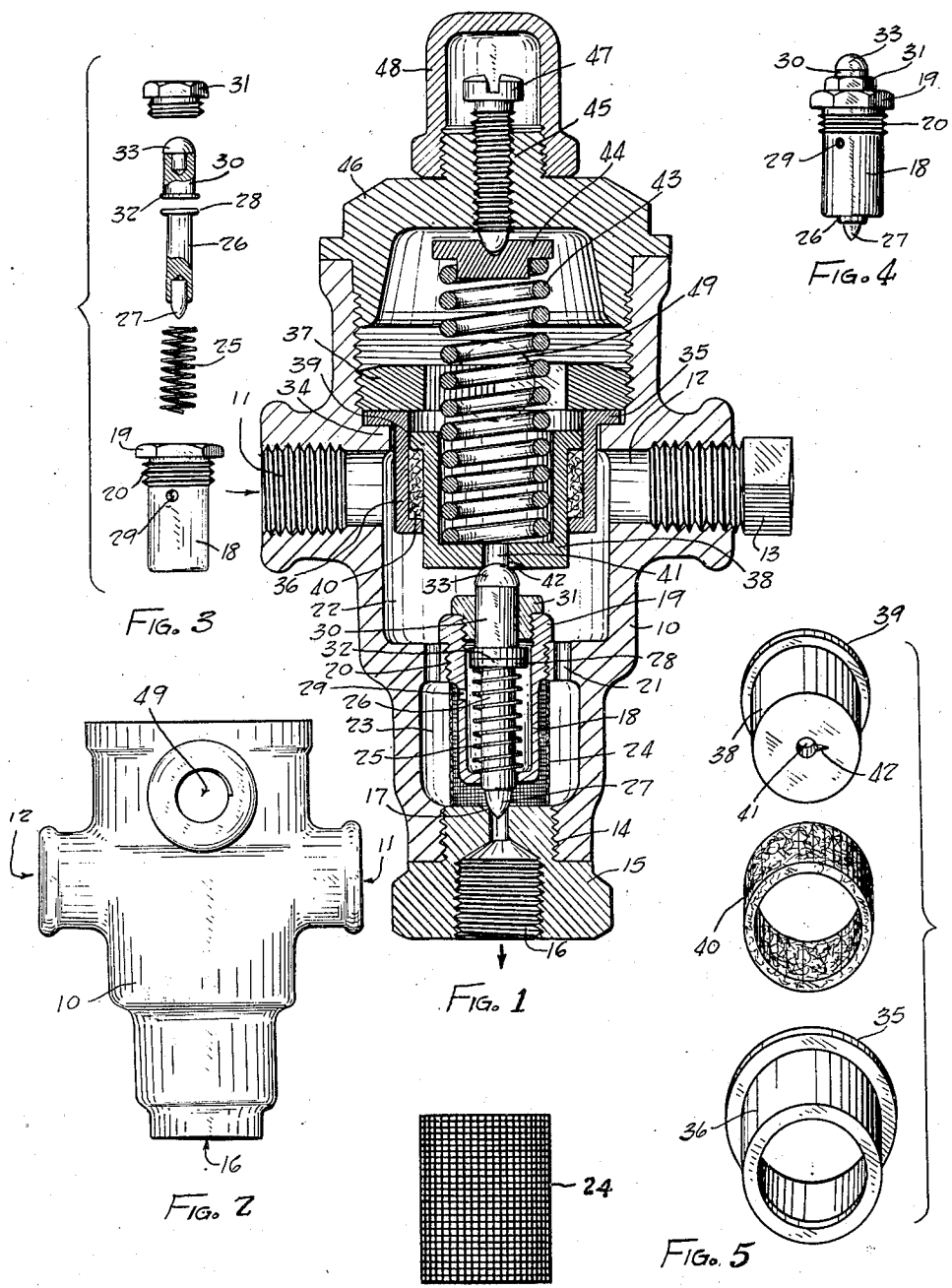
INVENTOR:
WALTER CZARNECKI Patented Aug. 4, 1936

2,050,041

UNITED STATES PATENT OFFICE 2,050,041

RELIEF VALVE

Walter Czarnecki, Eddington, Pa., assignor to Eddington Metal Specialty Co., Eddington, Pa., a corporation of Pennsylvania Application December 24, 1934, Serial No. 758,962

2 Claims. (Cl. 137—153)

This invention relates to relief valves, and has for an object to provide a valve of new and improved construction, relieving excess pressure in a new and improved manner.

A further object of the invention is to provide in a relief valve cooperating valve members sometimes moving together, and sometimes independently, with a movable valve seat associated with one of said valve members in a new and improved manner.

A further object of the invention is to provide in a relief valve cooperating members having telescoping walls, one of said members providing a valve seat for one of the independent valves.

A further object of the invention is to provide improved means for straining the output from the valve.

The invention, therefore, comprises a housing having inlet, outlet and by-pass ports, with a valve controlling the outlet port, and a valve controlling the by-pass port, said last mentioned valve cooperating with a valve seat carried by one member telescopically associated with a second member, whereby the chamber provided by the housing is divided into separate compartments of variable capacity, with means for regulating the pressure upon the telescoping organization for varying the pressure at which the valve will by-pass the fluid under pressure.

The drawing illustrate an embodiment of the invention and the views therein are as follows:

Figure 1 is a view in section showing the improved valve assembly.

Figure 2 is a view in elevation of the valve housing,

Figure 3 is an exploded view of the valve assembly,

Figure 4 is a view of the valve assembled,

Figure 5 is an exploded view of the telescoping organization, and

Figure 6 is a side elevation of the strainer.

Like characters of reference indicate corresponding parts throughout the several views.

The improved relief valve which forms the subject matter of this application comprises a housing 10 having two ports 11 and 12, either of which may be the inlet port. When one of these ports has been selected, as the inlet port, because of convenience in installation, the other port may be closed either by a plug 13, as shown at Figure 1, or as is contemplated, the association therewith of a pressure gauge.

The housing is provide at its normally lower end with a threaded opening 14 in which is seated a bushing 15 having a port 16 which normally communicates with a burner or other device employing the fluid, and also provides a valve seat at 17. A valve assembly shown in assembled condition at Figure 4 comprises a sleeve 18 having a multi-angular boss 19 formed thereon which, cooperating with a wrench or like utensil, may be employed to seat the valve assembly in the housing by means of the screw threads 20.

Adjacent to this valve assembly are a plurality of openings 21 forming communication between the chamber 22 and the annular chamber 23, the latter surrounding the valve assembly, shown at Figure 4. Surrounding the sleeve 18 is a strainer 24 of such size as to be inserted prior to the application of the boss 15.

The valve assembly, in addition to the sleeve 18, comprises a spring 25 which sits within the sleeve, and a valve member 26 inserted within the spring, and provided with a needle tip 27 cooperating with the valve seat 17. Preferably, this needle tip 27 will be formed of material harder than required for the valve body, and will, therefore, be applied thereto as indicated at Figure 3.

Also, this needle valve 27 will not be conical, but will be formed as generated by an arc moved about the axis, the lines of any cross section of which will, therefore, be arcuate.

The valve body 26 will be provided with a head 28 bearing upon the spring 25 and passages 29 will be formed through the sleeve 18 whereby the fluid within the annular chamber 23 may enter within the sleeve. Another valve member 30 will be seated to slide in a bushing 31 and provided with a head 32 seated upon the head 28 of the valve member 26. The valve body 30 will carry a valve contact 33 which like the needle member 27, will be composed of some harder, non-corrosive material and will be applied to the valve member 30 as shown at Figure 3. The member 40 will be formed preferably as a hemisphere exposed at the end of the valve body 30.

The housing is provided with an annular shoulder 34 upon which bears the flange 35 of the tubular member 36 and held in position by a threaded ring 37. Cooperating with the tubular member 36 is a telescoping member 38 having a flange 39 fitting within the interior of the sleeve 36, and with a packing material 40 filling the annular space provided by the flange 39. The telescoping member 38 is provided with a valve seat 41 which cooperates with the valve 33. This valve seat 41 is provided with a bleed groove 42, the function of which will be hereinafter more fully explained.

Seated within the telescoping member 38 is a spring 43 which is provided with a follower 44 and tension screw 45 which extends through a closure 46. The head 47 of this tension screw is preferably protected by the cap 48. Communicating with the interior of the housing is a by-pass port 49 which will be connected with any approved type of conduit for conveying by-passed fluid back to the source of supply.

In operation, fluid under pressure, as from a pump, is admitted through either of the ports 11 or 12, the other being closed either by the plugs 13, a pressure gauge, or any other available means. The fluid under pressure will fill the chamber 22, and pass through the passages 21 into the annular chamber 23. Pressure in the chamber 22 will build up until the spring 43 is affected, raising the telescoping member 38. The spring 25 will tend to raise the valves 26 and 30 as the telescoping member 38 rises, so that the fluid in the annular chamber 23 will pass through the screen 24 and out through the valve seat 17. The port 16 communicating with the valve seat 17 is, of course, connected with some conduit. The relief valve, here shown, is intended particularly for cooperation with an oil burner, but while not limited thereto, will, as presently seen, find its greatest utility in that field. So associated, the oil under pressure will, therefore, pass through the valve seat 17 and port 16 to the burner for consumption.

In such installations it has been found desirable to maintain a volume of oil greater than will be accommodated by the nozzle and the amount fed to the nozzle will be controlled by the valve 27. The excess volume must, therefore, be by-passed back to the source of supply. As the pressure builds up the excess volume the telescoping member 38 will be further raised and the head 32 of the valve 30 coming in contact with the bushing 31 will interrupt the movement of that valve and open the valve seat 41 so that the excess volume under excess pressure will flow through said valve seat 41 upwardly through the telescoping members, and out through the by-pass port 49 and will, naturally, be returned to the tank from which the supply is originally pumped.

Immediately upon lowering the pressure the telescoping member 38 will be impelled by the spring 43 to make engagement with the valve tip 33 and close the by-pass and if the pressure continues to drop the spring 43 will further move the valves 30 and 26 to close the port 17.

Of course, the relief valve illustrated may be modified and changed in various ways without departing from the invention herein set forth and hereinafter claimed.

I claim:

1. A relief valve of the character described comprising a housing formed with an inwardly extending shoulder, a sleeve having an outturned flange in engagement with said shoulder, the cylindrical portion of said sleeve being spaced from the housing, a piston movable in said sleeve and formed with a valve seat, means for yieldably maintaining the piston in extended relation with respect to the sleeve, a valve assembly movable with the piston, and means for limiting movement of the valve assembly whereby the valve seat in the piston is opened, said valve assembly including a valve member cooperating with a fixed valve seat formed in the housing.

2. A relief valve of the character described comprising a housing, a sleeve mounted in the housing and formed with an inwardly extending flange, a piston in said sleeve having an outwardly extending flange engaging the wall of the sleeve, while the inwardly extending flange of the sleeve engages the piston, said flanges on the sleeve and piston respectively cooperating to provide a chamber for receiving a packing material, said piston being formed with a valve seat, means for yieldably maintaining the piston in extended relation with respect to the sleeve, a valve assembly movable with the piston, and means for limiting movement of the valve assembly whereby the valve seat in the piston is open, said valve assembly including a valve member which cooperates with a fixed valve seat formed in the housing.

WALTER CZARNECKI.